(12) United States Patent
Liang et al.

(10) Patent No.: US 10,592,420 B1
(45) Date of Patent: Mar. 17, 2020

(54) DYNAMICALLY REDISTRIBUTE CACHE SPACE WITH MIN-MAX TECHNIQUE

(71) Applicant: EMC IP Holding Company LLC, Hopkinton, MA (US)

(72) Inventors: Shuang Liang, Sunnyvale, CA (US); Philip Shilane, Newtown, PA (US); Grant Wallace, Pennington, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 90 days.

(21) Appl. No.: 15/396,324

(22) Filed: Dec. 30, 2016

(51) Int. Cl.
  *G06F 12/08* (2016.01)
  *G06F 12/0871* (2016.01)
  *G06F 12/128* (2016.01)

(52) U.S. Cl.
  CPC ........ *G06F 12/0871* (2013.01); *G06F 12/128* (2013.01); *G06F 2212/604* (2013.01); *G06F 2212/621* (2013.01); *G06F 2212/69* (2013.01)

(58) Field of Classification Search
  CPC ............... G06F 12/0871; G06F 12/128; G06F 12/0873; G06F 12/084; G06F 12/0806; G06F 2212/604; G06F 2212/621; G06F 2212/6042
  See application file for complete search history.

(56) References Cited

U.S. PATENT DOCUMENTS

| | | | | |
|---|---|---|---|---|
| 7,558,919 B1* | 7/2009 | Yochai | ................ | G06F 12/0842 711/129 |
| 2004/0078518 A1* | 4/2004 | Kuwata | ................ | G06F 12/123 711/113 |
| 2005/0268031 A1* | 12/2005 | Matsui | ................ | G06F 12/121 711/113 |
| 2006/0288159 A1* | 12/2006 | Haruna | ............... | G06F 12/0871 711/113 |
| 2014/0059292 A1* | 2/2014 | Phelan | ................ | G06F 12/0866 711/113 |

* cited by examiner

*Primary Examiner* — Michael Krofcheck
(74) *Attorney, Agent, or Firm* — Womble Bond Dickinson (US) LLP

(57) ABSTRACT

One embodiment is related to a method for redistributing cache space, comprising: determining a request by a first client of a plurality of clients for additional cache space, each of the plurality of clients being associated with a guaranteed minimum amount (MIN) and a maximum amount (MAX) of cache space; and fulfilling or denying the request based on an amount of cache space the first client currently occupies, an amount of cache space requested by the first client, and the MIN and the MAX cache space associated with the first client.

21 Claims, 5 Drawing Sheets

200

DYNAMICALLY REDISTRIBUTE CACHE SPACE WITH MIN-MAX TECHNIQUE

CROSS-REFERENCE TO RELATED APPLICATION

This application is related to a separate U.S. patent application application Ser. No. 15/396,326, filed Dec. 30, 2016, titled "Dynamically Redistribute Cache Space Based on Time Savings."

FIELD OF THE INVENTION

Embodiments of the disclosure are related to electronic devices, and more particularly, to a method, apparatus, and system for dynamically redistributing cache space.

BACKGROUND

Caching is a common technique that accelerates data access. Usually there is a tradeoff between cost and speed when choosing the technology used to implement the cache. One common way of dealing with the tradeoff is to implement the cache with a hierarchy of layers: faster and costlier technology may be used to implement the higher layers, which tend to be smaller in size due to higher costs per unit of storage; relatively slower and less expensive technology may be used to implement the lower layers, which tend to be larger in size due to better affordability.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure relate to methods, apparatuses, and systems for dynamically redistributing cache space between clients. Hereinafter a client may refer to an application running on a system such as a server, where the client reads pre-stored data and therefore may benefit from data caching.

Caching is a common technique that accelerates data access. Usually there is a tradeoff between cost and speed when choosing the technology used to implement the cache. One common way of dealing with the tradeoff is to implement the cache with a hierarchy of layers: faster and costlier technology may be used to implement the higher layers, which tend to be smaller in size due to higher costs per unit of storage; relatively slower and less expensive technology may be used to implement the lower layers, which tend to be larger in size due to better affordability.

Figure 1:
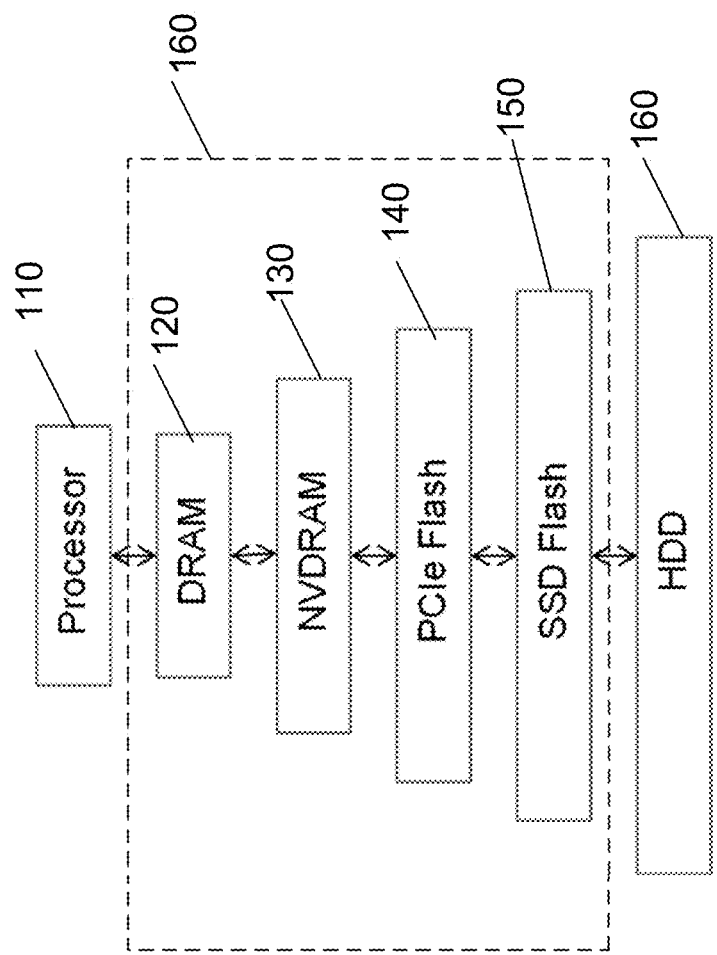
FIG. 1 is a block diagram illustrating an example environment in which embodiments of the disclosure may be practiced.

Referring to FIG. 1, a block diagram illustrating an example environment 100 in which embodiments of the disclosure may be practiced is shown. An example cache 170 resides between a processor 110 and a hard disk drive (HDD) 160. The cache 170 may be beneficial because the HDD 160 is likely to be a performance bottleneck. The cache 170 as shown in FIG. 1 comprises four layers: a highest layer implemented with dynamic random-access memory (DRAM) 120, which may be faster and smaller than a first intermediate layer implemented with non-volatile dynamic random-access memory (NVDRAM) 130, which may be faster and smaller than a second intermediate layer implemented with Peripheral Component Interconnect Express (PCIe) flash memory 140, which in turn may be faster and smaller than a lowest layer implemented with one or more flash memory-based solid-state drives (SSDs) 150. Typical latency times associated with the abovementioned example cache/storage layers are as follows: 80 nanoseconds (ns) for DRAM 120, 300 ns for NVDRAM 130, 10 microseconds (us) for PCIe flash memory 140, 80 us for SSD 150, and 10 milliseconds (ms) for HDD 160.

Figure 2:
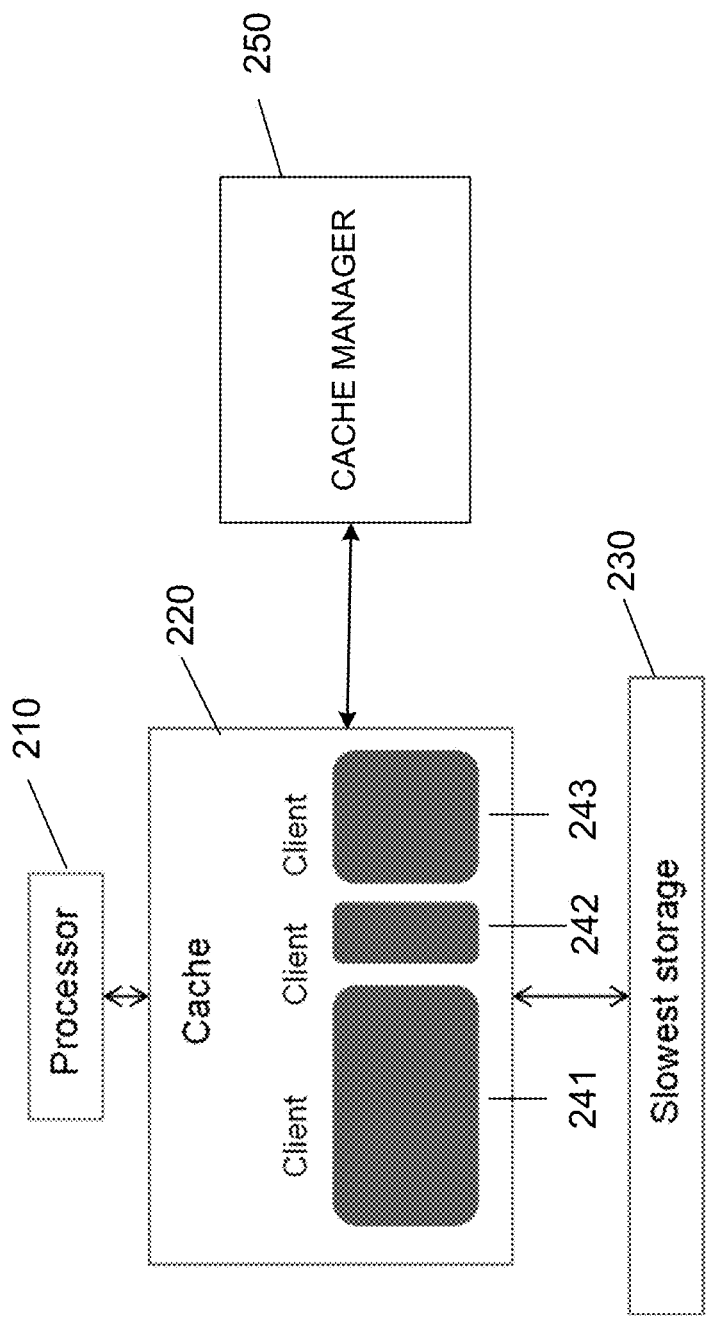
FIG. 2 is a block diagram illustrating an example environment in which embodiments of the disclosure may be practiced.

Referring to FIG. 2, a block diagram illustrating an example environment 200 in which embodiments of the disclosure may be practiced is shown. A cache 220 may reside between a processor 210 and a slowest storage device 230. Multiple clients (e.g., a first client 241, a second client 242, and a third client 243) running on a same system may share the cache 220. The clients 241, 242, 243 may have cache space requirements that change over time. In other words, they may have dynamic cache space requirements. The cache space requirements may change over time for a number of reasons, e.g., short term tasks, human interactions, or changing input/output (I/O) access patterns, etc. Methods for redistributing the total cache space between clients 241, 242, 243 that have dynamic cache space requirements may be needed. The cache 220 may be managed by a cache manager module 250. The cache manager module 250 may be implemented with hardware or a combination of hardware and software and with or without the processor 210 and may communicate with clients 241, 242, 243. Managing the cache 220 by the cache manager module 250 may comprise allocating cache space among clients 241, 242, 243.

Min-Max Technique

In one embodiment, each client may be associated with a guaranteed minimum value (MIN) and a maximum value (MAX) for the amount of cache space it may occupy. The MIN values for all clients may add up to less than or equal to 100% of the total cache space. The MAX value for a client is greater than or equal to the MIN value for the client. The MAX value for a client may be as large as the total cache space. The MAX values for all clients may sum to more than the total cache space.

Initially, each and every client may be assigned with zero cache space. A determination may be made when a client requests more cache space (e.g., through an "insertion" or "grow" request) as to whether the request will be fulfilled based on an amount of cache space the client currently occupies, a requested amount of cache space, and MIN and MAX values associated with the client. Before the amount of cache space occupied by a client reaches the MIN value associated with the client, a request for additional cache space by the client may be always fulfilled. If not enough empty cache space is available for such a request to be fulfilled, other clients that currently occupy more cache space than indicated by their respective MIN values may be required to release some cache space they currently occupy to the extent they occupy more cache space than indicated by their respective MIN values. The other clients may be cooperative (e.g., they can choose to accept or ignore cache release requests) or they may be forced to release particular amounts of cache space, so that the request of the client that currently occupies less cache space than indicated by its MIN value may be fulfilled. The amounts of cache space to be released may be proportions, fixed amounts, or any other values.

When the amount of cache space occupied by a client is between the MIN and MAX values associated with the client, a request by the client for additional cache space may be fulfilled on a best effort basis (e.g., fulfilled if empty cache space is available; denied if there is no empty cache space). When the amount of cache space occupied by a client reaches the MAX value associated with the client, all further requests by the client for additional cache space may be denied.

In one embodiment, cache clients occupying more cache space than its MIN value are requested to release cache space and may or may not fulfill the request. This may be referred to as a cooperative caching mode. The clients may be each associated with a priority, wherein a client occupying an amount of cache space that is larger than its MIN cache space may release the cache space to a requesting client in response to a determination that the requesting client is associated with a higher priority than itself and may refuse to release the cache space to the requesting client in response to a determination that the requesting client is not associated with a higher priority than itself. In another embodiment, a cache manager may enforce sizing such that clients can access (put/get) cache space but do not control the size of the cache directly. In this embodiment, the cache manager may alert cache clients about resize events that it is directly implementing.

The MIN-MAX technique described above guarantees that all clients will be able to receive at least as much as their respective MIN values. Because the MIN and MAX values for clients are preset by a user (e.g., an administrator), tuning may be required to find the optimal MIN and MAX values for all the clients.

Figure 3:
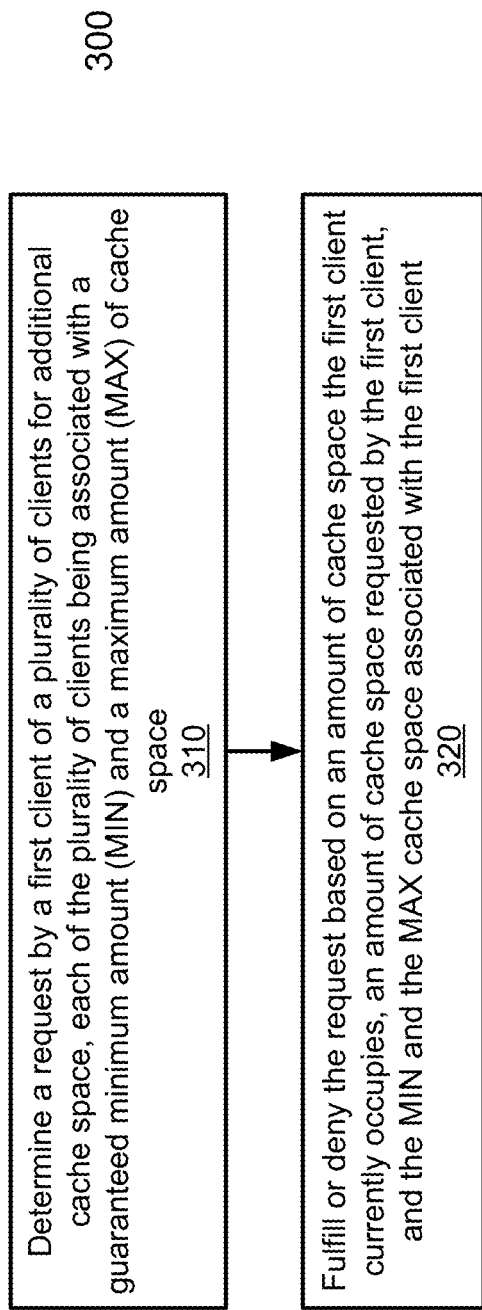
FIG. 3 is a flowchart illustrating an example method for redistributing cache space.

Referring to FIG. 3, a flowchart illustrating an example method 300 for redistributing cache space is shown. At block 310, a request by a first client of a plurality of clients for additional cache space may be determined, each of the plurality of clients being associated with a guaranteed minimum amount (MIN) and a maximum amount (MAX) of cache space. A sum of the MIN cache space for all of the plurality of clients is less than or equal to a total amount of cache space. At block 320, the request may be fulfilled or denied based on an amount of cache space the first client currently occupies, an amount of cache space requested by the first client, and the MIN and the MAX cache space associated with the first client. The request may be fulfilled in response to a determination that after fulfillment an amount of cache space the first client would occupy is less than or equal to the MIN cache space associated with the first client. Fulfilling the request may comprise requiring a second client of the plurality of clients to release an amount of cache space. The second client may be required to release a proportion of an amount of cache space it currently occupies or a fixed amount of cache space. The second client may be allowed to refuse to release the cache space in a cooperative mode. The clients may be each associated with a priority, wherein the second client occupying an amount of cache space that is larger than its MIN cache space may release the cache space to the first client in response to a determination that the first client is associated with a higher priority than the second client and may refuse to release the cache space to the first client in response to a determination that the first client is not associated with a higher priority than the second client. The request may be fulfilled or denied on a best effort basis in response to a determination that after fulfillment an amount of cache space the first client would occupy is greater than the MIN cache space associated with the first client but is less than or equal to the MAX cache space associated with the first client. In case the first client currently occupies less than its MIN cache space but after hypothetical fulfillment of its request in full would occupy more than its MIN cache space, the portion of the request up to its MIN cache space amount may be always fulfilled, and the remaining portion may be fulfilled or denied on a best effort basis. The request may be denied in response to a determination that after fulfillment an amount of cache space the first client would occupy is greater than the MAX cache space associated with the first client. In case the first client currently occupies more than its MIN cache space and less than its MAX cache space but after hypothetical fulfillment of its request in full would occupy more than its MAX cache space, the portion of the request up to its MAX cache space amount may be fulfilled or denied on a best effort basis, and the remaining portion may be denied.

Time Savings-Based Redistribution

It should be appreciated that different clients may utilize cache space with different efficiency. Different clients may access data with different frequencies. The cache hit ratio may increase in different ways for different clients as the clients take up additional cache space. Further, each cache hit may have different time savings for different clients. For example, each cache hit for a first example client may save 1 unit of time, for a second example client 8 units of time, and for a third example client 2 units of time. A unit of time may be the time of one I/O event at the slowest storage layer (e.g., HDD), which may take approximately 10 milliseconds; in contrast, a cache hit in the DRAM layer may take tens of nanoseconds to a few microseconds (i.e., approximately a four to six orders of magnitude difference).

The efficiency of cache space usage may be measured by the average time savings over a period of time per unit amount of cache space used. A cached data block may be associated with a utility value reflecting the efficiency of the usage of the cache space taken up by the data block. A cached data block may also be associated with an aged (modified) utility value emphasizing the more recent cache space usage efficiency and discounting events that happened too long ago. A client may be associated with a utility value reflecting the efficiency of the usage of the cache space taken up by the client. A client may also be associated with an aged (modified) utility value emphasizing the more recent cache space usage efficiency and discounting events that happened too long ago. In another embodiment, a client may also be associated with a marginal utility value, which may be the average of the utility values of the client's worst performing cached data blocks (e.g., the cached data blocks below the 10th percentile in terms of time savings, although the percentile rank may differ in different embodiments). The marginal client utility may be especially useful as an estimate of the utility of the cache space to be either removed or added to a client. The marginal utility value may also be aged. The utility values (both unmodified and aged) may be estimated with heuristics. For example, the number of avoided I/O events at the slowest storage layer may be used as a proxy for the amount of time savings, and the aging may be effected by reducing the weight of past efficiency at the time the efficiency is recalculated. Because heuristics may be biased, the estimated utility values may be adjusted to compensate for the bias. In different embodiments, either unmodified or aged utility values may be used when not specified, although one may yield better results than the other. Similarly, when not specified, the utility value of a client may refer to either the general utility value (i.e., a client utility value based on the utility of all cached data blocks of the client) or the marginal utility value (unmodified or aged).

In one embodiment, more emphasis may be placed on recent cache accesses than older cache accesses. If a utility value increases based on cache accesses, aging is a mechanism to discount cache accesses and therefore time savings that are too old. With aging, a numeric utility value may be discounted (e.g., by right-shifting a binary numeric value) periodically (e.g. once per hour), which results in a numeric decrease. A timestamp associated with a cached entry may be updated when the entry is accessed. When there is a cache hit, the entry's previous utility value may be aged based on the time that has elapsed in epochs. Then the utility may be increased for the current cache access event. The result may be referred to as an aged or modified utility value.

When an entry is inserted into a full cache, an existing entry may need to be evicted to make space. Alternatively, an asynchronous process may maintain a minimal amount of free space so that incoming insertions can be handled without delays. Generally, the item with the lowest utility value (after potentially giving it a minimal time period in the cache) may be selected for eviction. The item to evict may be from the same cache client or a different cache client. A priority queue may be used to maintain an ordering of entries by their (aged) utility. When an entry is to be evicted, the last item in the queue, which has the lowest utility value, may be selected. When an entry is accessed, its position may be updated in the queue based on its (aged) priority, which has presumably increased. It may be computationally expensive to recompute (aged) utility values for every item in the queue. A lazy method that is less computationally expensive may be utilized. With the lazy method, only the entries compared to the entry being updated need to be recalculated, which can be substantially less than the full list. The technique of lazy updating may require an aging function that maintains the relative order of entries over time. For example, the abovementioned aging function that right shifts utility by time in epochs has this property. If the priority queue is organized as a tree, then only Log(n) of the entries need to be evaluated where n is the number of nodes in the tree since branches to the left and right while searching through the tree do not have to be recalculated. It should be understood by one skilled in the art that other aging functions and data structures may be used. When an entry is inserted, a utility value may be assigned and inserted into the priority queue in the same way as when an entry is accessed.

Therefore, in one embodiment, cached data blocks with low utility values may be evicted from the cache and replaced with newly inserted cached data block with higher expected utility values. The (aged) utility value of the client inserting the new data block may be taken as the expected utility value of the new data block. In one embodiment, the cached data block associated with a lowest utility value may be evicted, and the client associated with a highest utility value may be allowed to insert a new data block. Multiple cached data blocks with low utility values may be evicted at once from the cache to make room for a new larger data block as long as the expected utility value of the new data block is greater than the utility values of the evicted data blocks.

In one embodiment, each client may be associated with a MIN cache space that guarantees a minimum amount of cache space for each client and/or a MAX cache space that places an upper limit on the amount of cache space each client may occupy. In another embodiment, clients may not be associated with MIN cache space and each client may potentially take as low as 0% and as high as 100% of the total cache space.

In one embodiment, the total cache space may be redistributed between the clients from time to time (e.g., periodically). The redistribution may be based on the utility values associated with the clients.

For example, in one embodiment, all clients except for the one with the highest utility value may release some of their cache space to be reallocated to clients with higher utility values. The percentage of the cache space to release for a client may be calculated as 10% (1−utility_value_of_the_client/sum_of_all_utility_values_associated_with_other_clients_with_higher_utility_values). Of course, another number than 10% may be used. The proportion of the total freed up cache space to be reallocated to a client may be calculated as utility_value_of_the_client/sum_of_utility_values_of_all_clients_receiving_space. In one embodiment, if reallocation of cache space to a client would cause the cache space of the client to exceed its MAX value (or 110% (adjustable number in different embodiments) of its current size), the excess may not be reallocated to the client but returned to clients with lower utility values proportionally to the excess.

As an example of the above algorithm, assume Client A has a utility value of 5 and the current size of its cache space 10 MB (Megabytes), Client B has a utility value of 4 and the current size of its cache space 100 MB, Client C has a utility value of 2 and the current size of its cache space 100 MB. Further assume the MAX value for each client is double its current size. Therefore, Client B needs to give 10%(1−4/(4+5))=5.5%=5.5 MB to Client A. And Client C needs to give 10%(1−2/(2+4+5))=8.2%=8.2 MB to Clients A and B. Client C will give to Client A, 5/(4+5) of 8 MB=4.6 MB. Client C will give to Client B, 4/(4+5) of 8 MB=3.6 MB. Client B is receiving 3.6 MB, which is less than 10% of Client B's current cache space size and would bring Client B to less than its MAX value, so this reallocation is implemented. For Client A, it is receiving 5.5 MB from Client B and 4.6 MB from Client C for a total of 10.1 MB. That is more than 10% of the 10 MB (=1 MB) current cache space size for Client A, so the actual reallocation needs to be adjusted. 1 MB/10.1 MB is the fraction to keep from each of the space given by the other clients. This means that Client B will give 1/10.1(=5.5 MB), and Client C will give 1/10.1 (=4.6 MB), and both Clients B and C keep the remainder. And Client A receives 1 MB in total.

Figure 4:
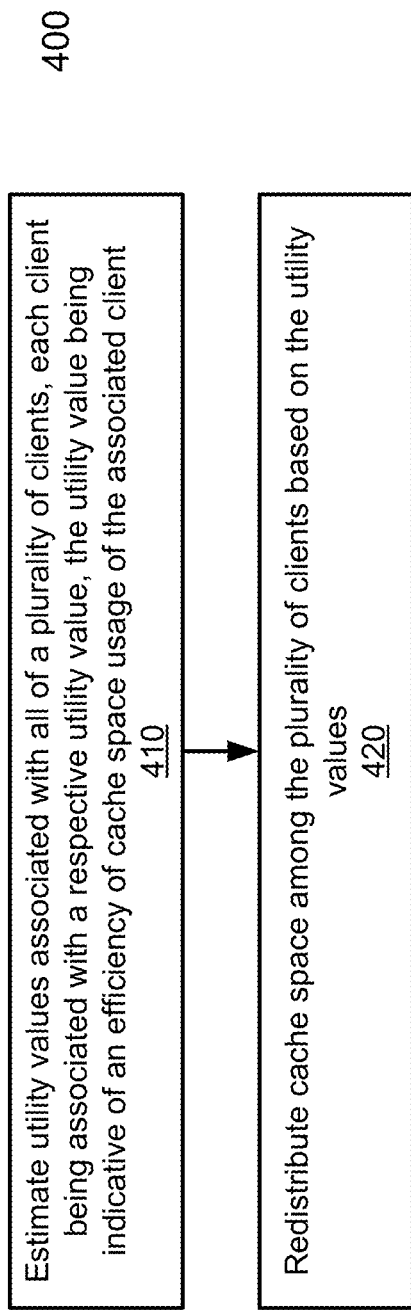
FIG. 4 is a flowchart illustrating an example method for redistributing cache space.

Referring to FIG. 4, a flowchart illustrating an example method 400 for redistributing cache space is shown. At block 410, utility values associated with all of a plurality of clients may be estimated, each client being associated with a respective utility value, the utility value being indicative of an efficiency of cache space usage of the associated client. Each of the utility values may indicate an amount of time saved per unit of cache space. The utility values may be aged based on a time elapsed since last cache access, wherein the time elapsed since last cache access may comprise a number of epochs elapsed, wherein an epoch may be a predefined time period. Aging a utility value may comprise right shifting the utility value in binary by the number of epochs elapsed. The client utility values may be preconfigured by a user and/or measured and/or updated. At block 420, cache space may be redistributed among the plurality of clients based on the utility values. Utility values associated with all cached data blocks of all of the plurality of clients may be determined, and a first cached data block with a first utility value of a first client may be evicted and replaced with a second cached data block of a second client, wherein an expected utility value of the second cached data block is greater than the first utility value. Evicting the first cached data block may be in response to a determination that the first client is occupying more than its MIN cache space. The expected utility value of the second cached data block may be a utility value (general or marginal) of the second client. When the utility value of the second client is a marginal utility value, it is based on cached data blocks with lowest utility values for the second client, wherein the cached data blocks with lowest utility values for the second client may comprise the client cached data blocks below a fixed percentile rank (e.g., 10%) in terms of utility. The cache space redistribution may or may not be subject to a guaranteed minimum of cache space and a maximum cache space for each of the plurality of clients. An order of cached data blocks may be maintained in a priority queue sorted by a utility function that preserves the order of the cached data blocks across aging of the utility values, wherein only aged utility values of the cached data blocks in the priority queue that are compared to a new cached data block may be calculated to position the new cached data block in the priority queue. In one embodiment, the cache space redistribution may be in a proportion to relative utility values of the clients.

Methods 300, 400 may be performed by processing logic that includes hardware (e.g. circuitry, dedicated logic, etc.), software (e.g., embodied on a non-transitory computer readable medium), or a combination thereof. For example, methods 300, 400 may be performed by processors 1501 of FIG. 5. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, according to the embodiments of the disclosure herein, in a system where a plurality of clients that have changing caching requirements share cache space, the cache space may be dynamically redistributed among the clients. The redistribution may be performed with a MIN-MAX technique or may be based on time savings to maximize the efficiency of cache space usage.

Figure 5:
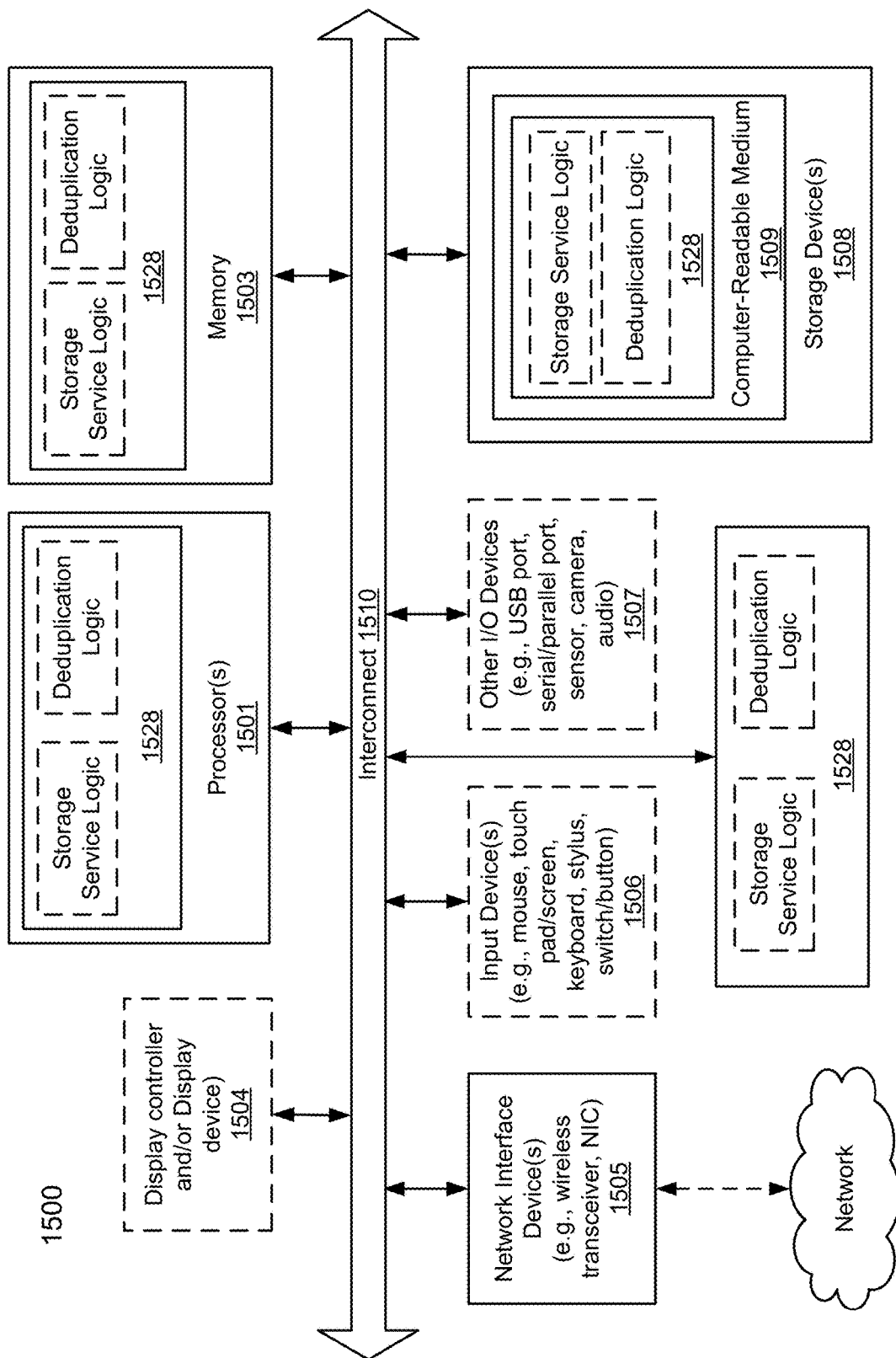
FIG. 5 is a block diagram illustrating an example of a data processing system which may be used with one embodiment of the disclosure.

FIG. 5 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for redistributing cache space, comprising:
determining a request by a first client of a plurality of clients for additional cache space, each of the plurality of clients being associated with a guaranteed minimum amount (MIN) and a maximum amount (MAX) of cache space; and
fulfilling or denying the request based on an amount of cache space the first client currently occupies, an amount of cache space requested by the first client, and the MIN and the MAX cache space associated with the first client, wherein the request by the first client is fulfilled or denied on a best effort basis in response to a determination that after fulfillment an amount of cache space the first client would occupy is greater than the MIN cache space associated with the first client but is less than or equal to the MAX cache space associated with the first client, wherein fulfilling or denying the request by the first client on a best effort basis comprises fulfilling the request when empty cache space is available to fulfill the request and denying the request when no empty cache space is available to fulfill the request, wherein the request for additional cache space is fulfilled in response to a determination that after fulfillment an amount of cache space the first client would occupy is less than or equal to the MIN cache space associated with the first client, wherein fulfilling the request comprises requiring a second client of the plurality of clients to release an amount of cache space to an extent the second client occupies more cache space than indicated by a MIN cache space associated with the second client, and wherein the second client is forced to release the amount of cache space when not in a cooperative caching mode.

2. The method of claim 1, wherein a sum of the MIN cache space for all of the plurality of clients is less than or equal to a total amount of cache space.

3. The method of claim 1, wherein the second client is required to release a proportion of an amount of cache space it currently occupies or a fixed amount of cache space.

4. The method of claim 1, wherein the second client is allowed to refuse to release the cache space in a cooperative mode.

5. The method of claim 1, wherein clients are each associated with a priority.

6. The method of claim 5, wherein the second client occupying an amount of cache space that is larger than its MIN cache space releases the cache space to the first client in response to a determination that the first client is associated with a higher priority than the second client and refuses to release the cache space to the first client in response to a determination that the first client is not associated with a higher priority than the second client.

7. The method of claim 1, wherein the request is denied in response to a determination that after fulfillment an amount of cache space the first client would occupy is greater than the MAX cache space associated with the first client.

8. A data processing system, comprising:
a processor; and
a memory coupled to the processor storing instructions which, when executed by the processor, cause the processor to perform testing operations, the operations including determining a request by a first client of a plurality of clients for additional cache space, each of the plurality of clients being associated with a guaranteed minimum amount (MIN) and a maximum amount (MAX) of cache space; and
fulfilling or denying the request based on an amount of cache space the first client currently occupies, an amount of cache space requested by the first client, and the MIN and the MAX cache space associated with the first client, wherein the request by the first client is fulfilled or denied on a best effort basis in response to a determination that after fulfillment an amount of cache space the first client would occupy is greater than the MIN cache space associated with the first client but is less than or equal to the MAX cache space associated with the first client, wherein fulfilling or denying the request by the first client on a best effort basis comprises fulfilling the request when empty cache space is available to fulfill the request and denying the request when no empty cache space is available to fulfill the request, wherein the request for additional cache space is fulfilled in response to a determination that after fulfillment an amount of cache space the first client would occupy is less than or equal to the MIN cache space associated with the first client, wherein fulfilling the request comprises requiring a second client of the plurality of clients to release an amount of cache space to an extent the second client occupies more cache space than indicated by a MIN cache space associated with the second client, and wherein the second client is forced to release the amount of cache space when not in a cooperative caching mode.

9. The data processing system of claim 8, wherein a sum of the MIN cache space for all of the plurality of clients is less than or equal to a total amount of cache space.

10. The data processing system of claim 8, wherein the second client is required to release a proportion of an amount of cache space it currently occupies or a fixed amount of cache space.

11. The data processing system of claim 8, wherein the second client is allowed to refuse to release the cache space in a cooperative mode.

12. The data processing system of claim 8, wherein clients are each associated with a priority.

13. The data processing system of claim 12, wherein the second client occupying an amount of cache space that is larger than its MIN cache space releases the cache space to the first client in response to a determination that the first client is associated with a higher priority than the second client and refuses to release the cache space to the first client in response to a determination that the first client is not associated with a higher priority than the second client.

14. The data processing system of claim 8, wherein the request is denied in response to a determination that after fulfillment an amount of cache space the first client would occupy is greater than the MAX cache space associated with the first client.

15. A non-transitory machine-readable medium having instructions stored therein which, when executed by a processor, cause the processor to perform testing operations, the operations comprising:
   determining a request by a first client of a plurality of clients for additional cache space, each of the plurality of clients being associated with a guaranteed minimum amount (MIN) and a maximum amount (MAX) of cache space; and
   fulfilling or denying the request based on an amount of cache space the first client currently occupies, an amount of cache space requested by the first client, and the MIN and the MAX cache space associated with the first client, wherein the request by the first client is fulfilled or denied on a best effort basis in response to a determination that after fulfillment an amount of cache space the first client would occupy is greater than the MIN cache space associated with the first client but is less than or equal to the MAX cache space associated with the first client, wherein fulfilling or denying the request by the first client on a best effort basis comprises fulfilling the request when empty cache space is available to fulfill the request and denying the request when no empty cache space is available to fulfill the request, wherein the request for additional cache space is fulfilled in response to a determination that after fulfillment an amount of cache space the first client would occupy is less than or equal to the MIN cache space associated with the first client, wherein fulfilling the request comprises requiring a second client of the plurality of clients to release an amount of cache space to an extent the second client occupies more cache space than indicated by a MIN cache space associated with the second client, and wherein the second client is forced to release the amount of cache space when not in a cooperative caching mode.

16. The non-transitory machine-readable medium of claim 15, wherein a sum of the MIN cache space for all of the plurality of clients is less than or equal to a total amount of cache space.

17. The non-transitory machine-readable medium of claim 15, wherein the second client is required to release a proportion of an amount of cache space it currently occupies or a fixed amount of cache space.

18. The non-transitory machine-readable medium of claim 15, wherein the second client is allowed to refuse to release the cache space in a cooperative mode.

19. The non-transitory machine-readable medium of claim 15, wherein clients are each associated with a priority.

20. The non-transitory machine-readable medium of claim 19, wherein the second client occupying an amount of cache space that is larger than its MIN cache space releases the cache space to the first client in response to a determination that the first client is associated with a higher priority than the second client and refuses to release the cache space to the first client in response to a determination that the first client is not associated with a higher priority than the second client.

21. The non-transitory machine-readable medium of claim 15, wherein the request is denied in response to a determination that after fulfillment an amount of cache space the first client would occupy is greater than the MAX cache space associated with the first client.

* * * * *